United States Patent
Bing

(10) Patent No.: US 11,938,575 B2
(45) Date of Patent: Mar. 26, 2024

(54) MANUFACTURING PROCESS FOR BLADES OF A TURBO MACHINE AND BLADES FOR A TURBO MACHINE

(71) Applicant: ROLLS-ROYCE plc, London (GB)

(72) Inventor: Graham J Bing, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/829,492

(22) Filed: Jun. 1, 2022

(65) Prior Publication Data
US 2023/0055845 A1    Feb. 23, 2023

(30) Foreign Application Priority Data
Jun. 29, 2021 (GB) ..................... 2109321

(51) Int. Cl.
*B22D 25/02* (2006.01)
*B22C 9/10* (2006.01)
*B23P 15/02* (2006.01)

(52) U.S. Cl.
CPC ............... *B23P 15/02* (2013.01); *B22C 9/10* (2013.01)

(58) Field of Classification Search
CPC ... B23P 15/02; B22C 9/10; B22C 9/04; B22C 9/24; B22C 21/14; B22C 7/02; B22D 27/045
See application file for complete search history.

(56) References Cited

U.S. PATENT DOCUMENTS

| | | | |
|---|---|---|---|
| 2,972,805 A | 2/1961 | Hignett et al. | |
| 5,465,780 A | 11/1995 | Muntner et al. | |
| 5,611,389 A | 3/1997 | Alessandri et al. | |
| 2007/0284411 A1* | 12/2007 | Luczak | B22C 9/103 228/101 |
| 2017/0008072 A1* | 1/2017 | Cui | B22C 9/24 |

FOREIGN PATENT DOCUMENTS

| | | | | |
|---|---|---|---|---|
| EP | 1 857 199 A1 | 11/2007 | | |
| FR | 2 987 292 A1 | 8/2013 | | |
| FR | 2987292 A1 * | 8/2013 | ............... | B22C 9/10 |
| WO | WO-2017149400 A1 * | 9/2017 | ............... | B23C 3/18 |

OTHER PUBLICATIONS

English translation of FR2987292A (Year: 2013).*
English translation of WO-2017149400-A1 (Year: 2017).*
Nov. 14, 2022 Extended Search Report issued in European Patent Application No. 22177714.7.
Oct. 25, 2021 Search Report issued in British Patent Application No. GB2109321.6.
Ma, Dexin, "Novel casting processes for single-crystal turbine blades of superalloys," 2018.

* cited by examiner

*Primary Examiner* — Jun S Yoo
(74) *Attorney, Agent, or Firm* — Oliff PLC

(57) ABSTRACT

A manufacturing process for blades of a turbomachine, e.g. a gas turbine engine for an aircraft. In the process: a) a ceramic core piece that comprises at least two ceramic core elements and a clamping part that connects the ceramic core elements, is positioned in a wax forming device, subsequently; b) a molten wax material is applied to the outside of the ceramic core piece in the wax forming device and the wax is allowed to solidify, and subsequently; c) at least two turbomachine blades are cast using a crystallographically-oriented metal casting process and the wax and the ceramic core piece are removed.

15 Claims, 6 Drawing Sheets

MANUFACTURING PROCESS FOR BLADES OF A TURBO MACHINE AND BLADES FOR A TURBO MACHINE

CROSS-REFERENCE TO RELATED APPLICATIONS

This specification is based upon and claims the benefit of priority from United Kingdom patent application number GB 2109321.6 filed on Jun. 29 2021, the entire contents of which is incorporated herein by reference.

BACKGROUND

Field of the Disclosure

The present disclosure relates to manufacturing blades for a turbomachine. More particularly, a process for manufacturing turbomachine blades, for example turbomachine blades for a gas turbine engine for an aircraft.

Description of the Related Art

The manufacturing of blades using crystallographically-oriented casting is generally known, in particular for blades that are subjected to very high temperatures within e.g. a gas turbine engine for an aircraft. Such single crystal blades retain their mechanical properties even at very high temperatures.

As the efficiency of a turbomachine correlates with the combustion temperature and hence, the turbine inlet temperature (e.g. 1600° C. or higher), several measures, as e.g. using Nickel superalloys, applying thermal barrier coating and internal cooling, are taken to provide for blades that can withstand those conditions.

Generally, such blades can be manufactured by a crystallographically-oriented casting process, such as a single crystal casting process (e.g. Bridgeman process) or a directed solidification process (see e.g. Pratt, "Industrial casting of superalloys", *Material Science and Technology*, May 1986).

The cost for manufacturing single crystal blades is very high and takes a long time due to the long solidification process and the many processing steps.

Therefore, efficient manufacturing processes addressing these issues are required.

SUMMARY OF THE DISCLOSURE

In a first aspect there is provided a process for manufacturing turbomachine blades, the process comprising the following steps:
 a) a ceramic core piece that comprises at least two ceramic core elements and a clamping part that connect the ceramic core elements, is positioned in a wax forming device, subsequently;
 b) a molten wax material is applied to the outside of the ceramic core piece in the wax forming device and the wax is allowed to solidify, and subsequently;
 c) at least two turbomachine blades (e.g. two or four turbomachine blades) are cast using a crystallographically-oriented metal casting process and the wax and the ceramic core piece are removed.

In step a) the at least two ceramic core elements of the ceramic core piece will form the internal structure of the turbomachine blade which will eventually be cast in the process.

In some embodiments, two ceramic core elements are used. In some embodiments, four ceramic core elements are used.

The clamping part connects the at least two ceramic core elements so that they can be efficient and securely handled, given the rather complex shaped and usually delicate ceramic core elements.

Step b) is the per se known step in investment casting processes. In this process, the wax covers the clamping part as well as the at least two ceramic core elements.

In step c) the ceramic core piece is removed after casting. After shelling, the wax material is removed. The alloy is poured then into the fired ceramic mold. The ceramic mold is removed after casting, and the ceramic core is leached out using alkaline.

In some embodiments of this process, before those steps, between those steps and/or after those steps, further processing steps can take place.

In some embodiments of the process, the crystallographically-oriented casting process is a single crystal casting process (e.g. a Bridgman process), a directed solidification process, or an equiaxed grain casting process (i.e. conventional investment casting without any directionally controlled solidification).

In some embodiments, the turbomachine blades are parts of a high pressure stage or an intermediate pressure stage in the turbomachine, as the thermal exposure of those turbomachine blades is the highest.

As the damping part is e.g. block shaped, it allows in particular a secure handling of the ceramic core piece where the ends (i.e. the complex shaped part for the internal channels and cavities) are difficult to handle. As the wax is covering the complete ceramic core piece (i.e. the ceramic core elements and the clamping part), the two cast turbomachine blades at the end of the manufacturing process will still be linked together and can be handled e.g. by a robot in a secure way. Also intermediate process steps can be performed with both turbomachine blades linked together as a turbomachine blade cast piece, which is easier to handle than separately cast turbomachine blades.

In some embodiments, the ceramic core piece has an axial length that is between 80 and 130 mm. It is also possible that the turbomachine blades have an axial length that is between 10 and 30 mm, between 15 and 50 mm, or potentially up to 100 mm. Those rather small turbomachine blades are otherwise difficult to handle.

In some embodiments, the at least two ceramic core elements of the ceramic core piece are essentially arranged collinearly along their longitudinal axes. This allows an efficient access of the wax into the wax forming device.

It is also possible to arrange four ceramic core elements by having two parallel rows of two collinearly arranged ceramic core pieces. This is a 2×2 arrangement in which the ceramic core elements are located in the corners a block.

It is possible that two ceramic core elements are connected both in a tip-up position relative to the clamping part or that the two ceramic core elements are connected both in a tip-down position relative to the clamping part. Alternatively, one core element is in a root-up position and one core element is in a tip-up position.

Furthermore, in some embodiments, after the waxing process at least one coating layer is applied on the outer surface of the wax. The coating here may refer to coating the wax with a ceramic slurry, building a shell.

In some embodiments, the wax forming device is a wax mold device or a 3D wax printing device. Also, the ceramic core piece can be manufactured by an additive manufacturing process, e.g. a 3D-printing process.

In a second aspect there is provided a turbomachine blade that is manufactured or manufacturable by the process of the first aspect.

The turbomachine blade is, for example, for a high pressure turbine or an intermediate pressure turbine for an aircraft.

The turbomachine blade may be a low pressure turbine blade, as in a three stage turbomachine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

BRIEF DESCRIPTION OF THE DRAWINGS

Embodiments will now be described by way of example only, with reference to the Figures, in which.

Figure 1:
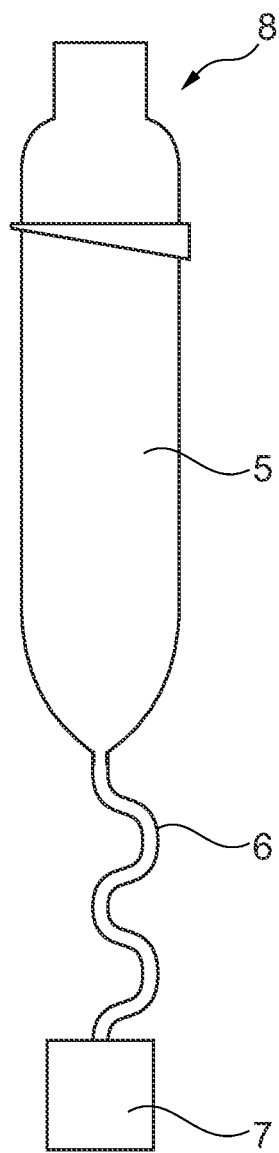
FIG. 1 schematically shows the result of single crystal casting of a blade before finishing.

The following table lists the reference numerals used in the drawings with the features to which they refer:

| Ref no. | Feature | FIG. |
| --- | --- | --- |
| 1 | ceramic core piece | 2 3 |
| 1' | first ceramic core element | 2 9 |
| 1" | second ceramic core element | 2 4 5 6 7 8 9 |
| 1''' | third ceramic core element | 9 |
| 1'''' | fourth ceramic core element | 9 |
| 2 | clamping part | 2 9 |
| 5 | turbomachine blade | 1 |
| 6 | selector ("pig tail") | 1 |
| 7 | starter block | 1 |
| 8 | dove tail section | 1 |
| 9 | tip exit | 4 5 6 7 |
| 10 | blade section in wax mold | 3 |
| 11 | stabilizer | 7 |
| 12 | openings | 8 |

-continued

| Ref no. | Feature | FIG. |
| --- | --- | --- |
| 13 | block | 8 |
| 14 | channels | 8 |
| 20 | clamping section in wax mold | 3 |
| 100 | wax mold device, wax forming device | 3 |
| A | longitudinal axis of the ceramic core piece | 2 |
| W | wax | 3 |

DETAILED DESCRIPTION OF THE DISCLOSURE

Aspects and embodiments of the present disclosure will now be discussed with reference to the accompanying figures. Further aspects and embodiments will be apparent to those skilled in the art.

The starting point for an embodiment described herein is the preparation of a ceramic core piece 1 for a single crystal casting process that is based on a lost wax casting process (investment casting).

The ceramic material of the ceramic core piece 1 may comprise ceramic powder such as fused silica, zircon powder and SiC. This ceramic powder is mixed with a binder e.g. comprising paraffin wax and stearic acid. The ceramic powder might take in the order of 80 vol % of the total ceramic material used for the ceramic core piece 1, 2. Other embodiments might deviate from data given here.

The ceramic core piece 1 is then given a shape representing the cooling channels and the cavities in the completed hollow turbomachine blade 5. The internal cooling of the turbomachine blades 5 e.g. allows an operation at e.g. 90% of the melting temperature of the alloy used.

The embodiments of the manufacturing process are specifically related to the arrangement of the ceramic core piece 1, the handling of it in the casting process and the further handling of the metal pieces after the removing of the wax W and the metal casting.

As an example of a crystallographically-oriented casting process, a Bridgeman process is described herein for the manufacturing of single crystal turbomachine blades 5.

In this generally known process, single crystals are formed from below a mold by keeping the molten metal above the melting point.

Figure 3:
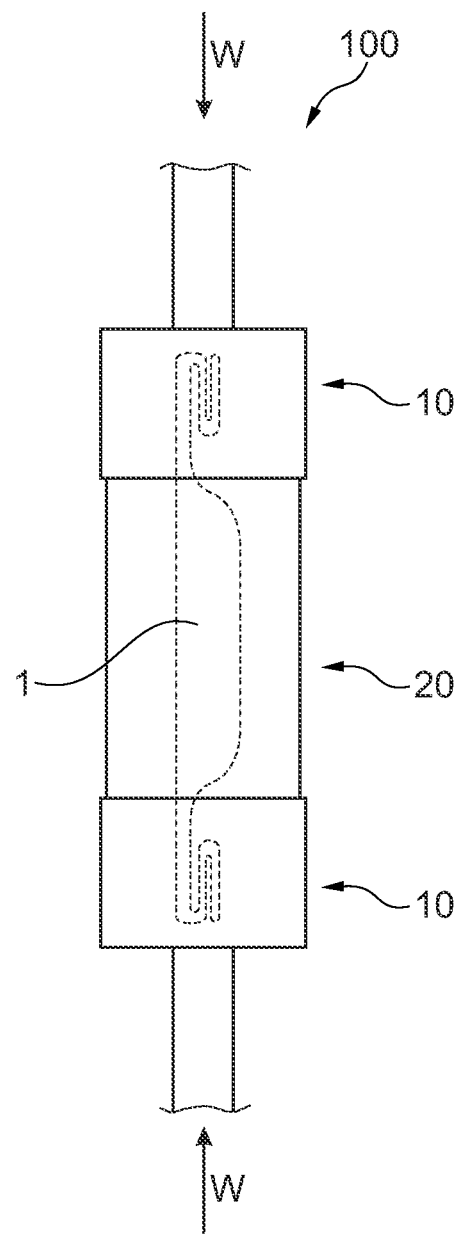
FIG. 3 schematically shows a waxing mold in the manufacturing of a single crystal blade.

In the embodiment of the process described here, the ceramic core piece 1 is covered with wax material in a mold (see FIG. 3). Afterwards, the wax is coated e.g. with alumina. After the removal of the wax W, the metal is cast into the mold in which the single crystal turbomachine blade 5 grows. The result before the finishing is shown in FIG. 1, the turbomachine blade 5 already recognizable.

The single crystal turbomachine blade 5 is grown from a starter block 7 via the selector 6 ("pig tail") which eliminates unwanted crystal orientations. At the other end of the blade 5, the section that will be the dovetail section 8 or fir tree section of the blade 5 is located.

Generally, there is an increased demand for small aircraft engines, requiring small turbomachine blades 5 to be manufactured at a very competitive cost.

The embodiments described below use one ceramic core piece 1 (see FIG. 2) comprising two ceramic core elements 1', 1" and a clamping part 2, which are covered together with wax W and then further processed, e.g. cast in metal.

The ceramic core piece 1 is later removed in the investment casting process. But the cast turbomachine blades 5 are still connected (i.e. they form a blade cast piece) as the wax W has been covering the complete ceramic core piece 1. Therefore, the two turbomachine blades 5 are still in one piece after the casting, allowing a better handling of the two, often delicate, turbomachine blades 5. Only towards the end of the manufacturing process, the blade cast piece is separated into its two elements, the turbomachine blades 5.

As the turbomachine blades 5 can e.g. have a length of only 10 to 30 mm, the handling of larger pieces, i.e. the ceramic core piece 1 with the two ceramic core elements 1', 1" is quicker and easier. The blade cast piece is cut into two turbomachine blades 5 at the end of the manufacturing process, reducing the operation time/cost by at least half on many operations.

The embodiment described can be e.g. used to manufacture crystallographically-oriented turbomachine blades 5 for the first or second stage of a high pressure turbine or an intermediate pressure turbine.

Figure 2:
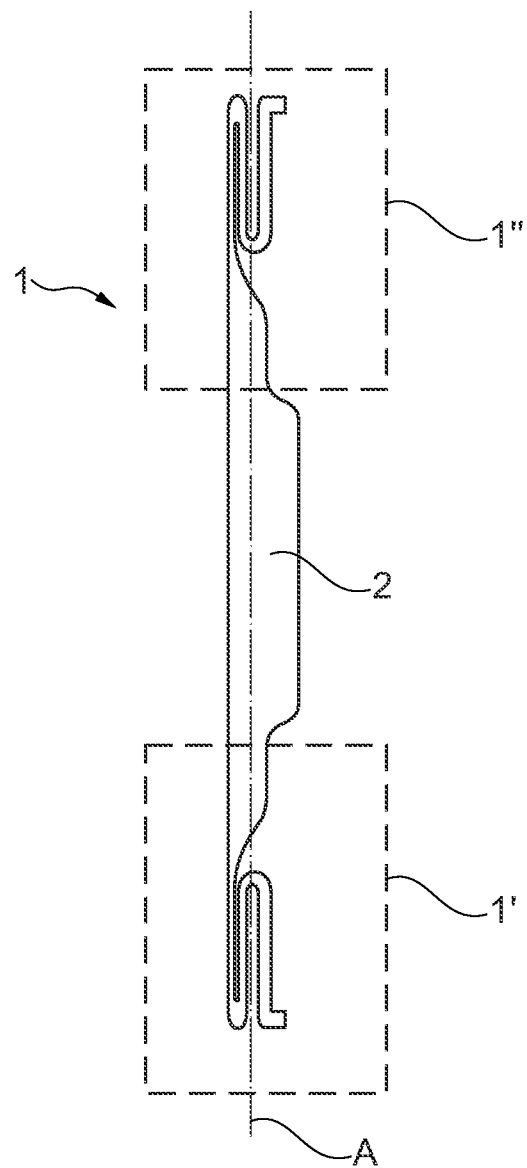
FIG. 2 schematically shows an embodiment of a ceramic core piece from which turbomachine blades are manufactured by the process of the present disclosure.
Figure 9:
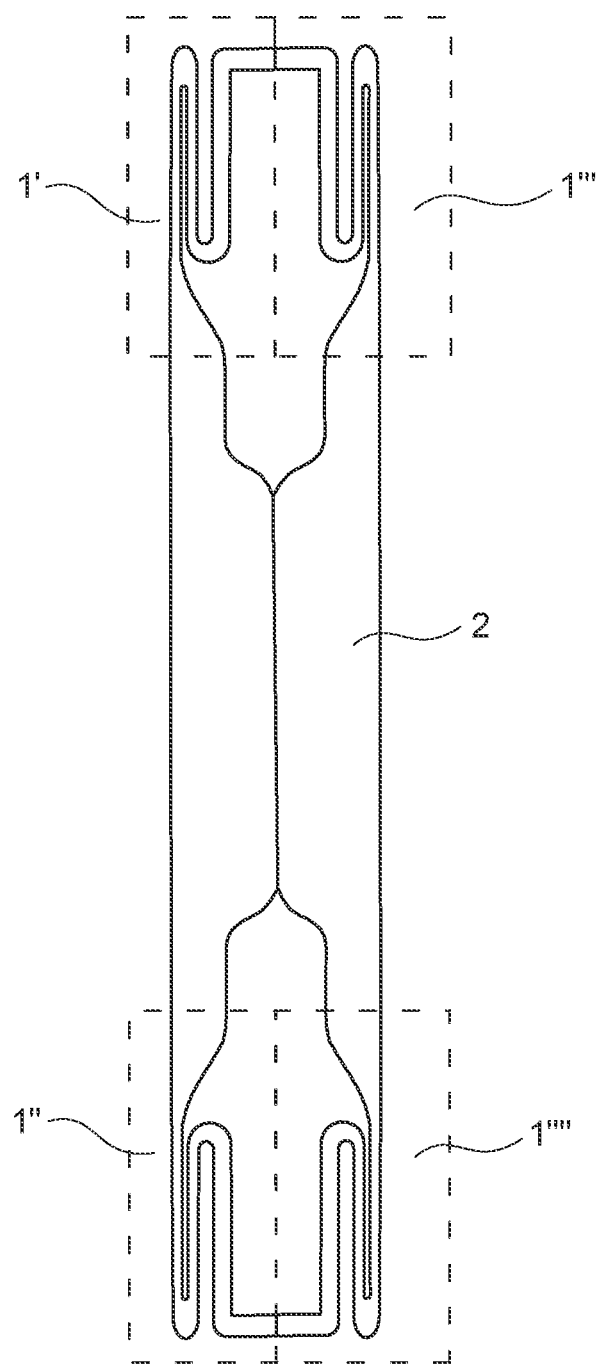
FIG. 9 schematically shows a detail of an arrangement using four ceramic core elements of a double ceramic core piece from which turbomachine blades are manufactured by the process of the present disclosure.

In FIG. 2, a cross-sectional view of an embodiment of ceramic core piece 1 is shown. The ceramic core piece 1 comprises two ceramic core elements 1', 1", which are collinearly oriented relative to a longitudinal axis A of the ceramic core piece 1. The two ceramic core elements 1', 1" will eventually form the cooling channels and cavities within the respective finished turbomachine blades 5. Therefore, a double ceramic core piece 1 is used instead of a single ceramic piece. In FIG. 9, a similar arrangement with four ceramic core elements 1', 1", 1'", 1"" is described.

The two ceramic core elements 1', 1' are joined at one of their respective ends with the damping part 2 which can be used to better handle the complete double blade piece during the complete casting and manufacturing process. The clamping part 2 has a relatively large central area (e.g. in the shape of a block) for gripping and clamping and potentially for a dimensional alignment.

At the ends opposite to the clamping part 2, a complex passage arrangement (e.g., triple pass) in the form of a cantilevered arrangement is positioned in the ceramic core pieces 1', 1".

In this arrangement, the first ceramic core element 1' will be cast tip-down, and the second ceramic core element 1" will be cast tip-up. The tang section of the blade section is directly connected to the clamping section 2. In FIGS. 4 to 8, different embodiments of ceramic core pieces 1' are described.

The overall axial length of the ceramic piece 1 can e.g. be in the range of 80 to 130 mm, so that the two manufactured turbomachine blades 5 will each have a height in the range of 10 to 30 mm.

The clamping part 2 is thicker than the ceramic core element 1', 1" and essentially block-shaped. Therefore, the clamping part 2 can be efficiently handled, e.g. by robot. In general, the clamping part 2 does not have to be as small as the core, allowing a bigger surface to clamp on and get more repeatable positioning.

Subsequently, the ceramic core piece 1 will be covered in wax in a wax mold (see FIG. 3), resulting in a double wax pattern.

In FIG. 3, a wax molding device 100 is schematically shown, the device comprising a central clamping section 20 having each one blade section 10 at its end. The ceramic core piece 1 (see FIG. 2) is positioned in the wax molding device 100 (as a special form of a wax forming device) as shown by the dashed lines. The molten wax W is then supplied to each of the blade sections 10, forming the basis for the further manufacturing process.

Each half of the wax patterns may have a subtly different continuator/cast feeding arrangement, to compensate for casting porosity on top face in mold attitude. For example, one part would have a higher porosity on the platform top, the other would have a higher porosity on the platform bottom.

The double-wax pattern may have standard handling features for robotic handling allowing manual or automated assembly.

The double blade piece is subsequently fired, fettled and/or machined as one piece and prepped for dispatch (impregnated, buttered etc. as required).

The double blade piece can also have a simple coating applied e.g. by aluminizing. The bulk of the operating cost is handling, so the cost for this is also halved to get per-blade cost.

The shelling and casting process would follow he generally known procedure. The large volume tang is required once per two parts, saving alloy cost. Here, the tang is a large clamping face in the casting, which is later removed i.e. in-process scrap material. A small part needs a relatively large clamping face, so one would have to double the alloy volume. The embodiments shown require only one large clamping face per two blades, therefore it is more alloy efficient.

After the casting operation, the double blade piece is processed through core leach and heat treatment, and all finish dressing operations (if any), and all non-destructive examination preparation operations.

The large blade piece, originating from the ceramic core piece 1, is easier to handle, and the processing operations piece-cost is divided in two to get the per-blade cost.

The inspection scrutiny operations require equal attention on both turbomachine blades 5, but the handling and machine loading elements of the operation time is reduced as the larger part is easier to handle, and the loading cycle time is divided in two.

The double blade piece can be dispatched into machining as it is, and the relatively large area between the two small elements, the clamping part, serves as a clamping face e.g. for fir-tree machining, at the end of the turbomachine blades 5 opposite the tip.

The double blade piece can remain in one piece also e.g. through grinding and film cooling (and welding if required) as a double piece.

The process has been described in connection with a wax mold device 100, which is a form of a wax forming device. Alternative wax forming devices could use a 3D wax printing device.

Figure 4:
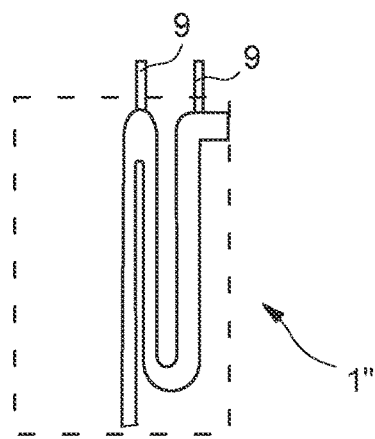
FIG. 4 schematically shows a detail of an embodiment of a first ceramic core element of a ceramic core piece.

In FIG. 4 a variation of the second ceramic core element 1" is shown which comprises the multiple pass arrangement with two tip exits 9. The second ceramic core element 1' (not shown in FIG. 4) would be shaped likewise. Therefore, the above description is applicable to this embodiment. The same is true for the embodiments shown in FIGS. 5 to 8 below.

Figure 5:
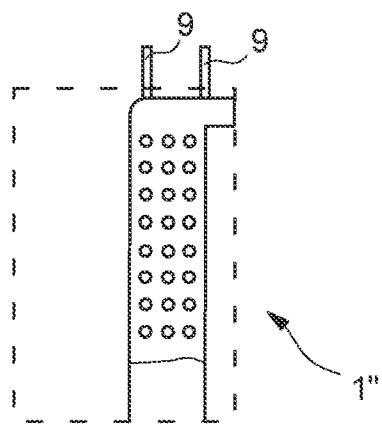
FIG. 5 schematically shows a detail of an embodiment of a second ceramic core element.

In FIG. 5 a variation of the embodiment shown in FIG. 4 is depicted. The second ceramic core element 1" is block-shaped with openings.

Figure 6:
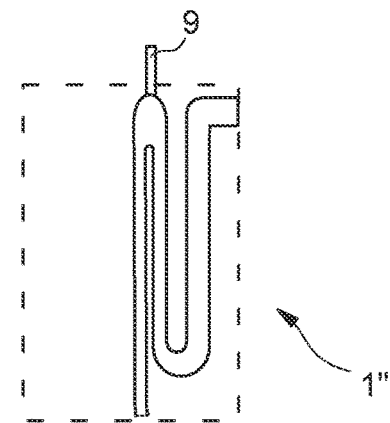
FIG. 6 schematically shows a detail of an embodiment of a third ceramic core element.

In FIG. 6 a further variation of the embodiment of FIG. 4 is shown, also a multipass arrangement, but only with one tip exit 9.

Figure 7:
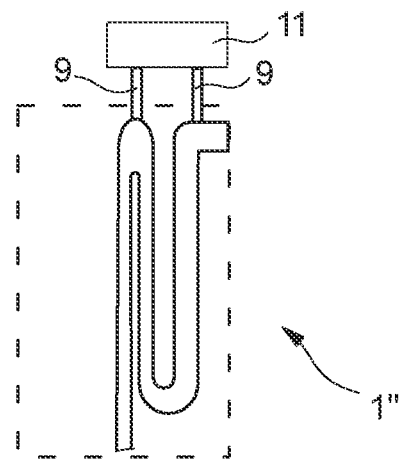
FIG. 7 schematically shows a detail of n embodiment of a fourth ceramic core element.

In FIG. 7 a variation of the second ceramic core element 1" like that of FIG. 4 is shown however a stabilizer 11 is provided for the exits 9.

Figure 8:
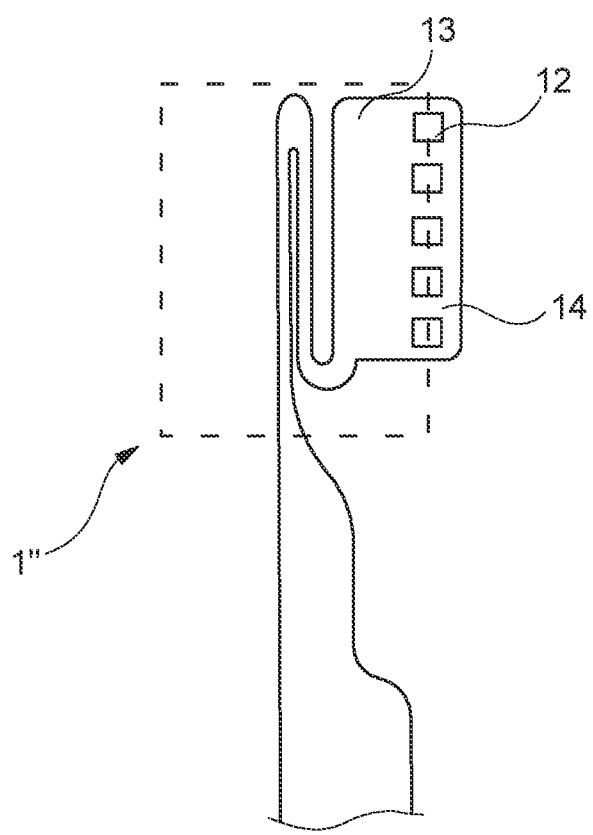
FIG. 8 schematically shows a detail of an embodiment of a fifth ceramic core element.

In FIG. 8 the end of the multipass arrangement ends in a block 13 with openings 12 forming six channels 14 which in the completed turbomachine blade 5 would define six outlets at the trailing edge of the blade. The block stabilizes those channels 14, which are delicate parts, e.g. for the small blades for which this embodiment is particularly useful.

In FIG. 9 a modification of the embodiment shown in FIG. 2 is shown, so that the above description is applicable. Instead of two ceramic core elements, there are four ceramic core elements 1', 1", 1''', 1'''' arranged in two parallel rows of two collinearly arranged ceramic core pieces (1', 1", 1''', 1''''). The ceramic core pieces 1', 1" are mirrored as ceramic core pieces 1''', 1''' along the middle axis of the arrangement.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A process for manufacturing turbomachine blades, the process comprising:
   a) positioning in a wax forming device a ceramic core piece that comprises at least two ceramic core elements and a clamping part that connects the ceramic core elements, subsequently;
   b) applying a molten wax material to an outside of the ceramic core piece in the wax forming device and allowing the wax to solidify, subsequently;
   c) casting at least two turbomachine blades using a crystallographically-oriented metal casting process and removing the wax and the ceramic core piece to form a blade cast piece, and subsequently;
   d) cutting the blade cast piece to separate the at least two turbomachine blades from each other.

2. The process of claim 1, wherein the crystallographically-oriented metal casting process is a single crystal casting process, a directed solidification process, or an equiaxed grain casting process.

3. The process of claim 1, wherein the turbomachine blades are parts of a high pressure stage or an intermediate pressure stage in a turbomachine.

4. The process of claim 1, wherein the ceramic core piece has an axial length that is between 80 and 130 mm.

5. The process of claim 1, wherein the turbomachine blades have an axial length that is between 10 and 100 mm.

6. The process of claim 5, wherein the turbomachine blades have an axial length that is between 15 and 50 mm.

7. The process of claim 5, wherein the turbomachine blades have an axial length that is between 10 and 30 mm.

8. The process of claim 1, wherein the at least two ceramic core elements of the ceramic core piece are arranged collinearly along their longitudinal axes.

9. The process of claim 1, wherein the at least two ceramic core elements comprise four ceramic core elements that are arranged by having two parallel rows of two collinearly arranged ceramic core pieces.

10. The process of claim 1, wherein the at least two ceramic core elements comprise two ceramic core elements that are connected (i) both in a tip-up position relative to the clamping part or (ii) one core element is in a root-up position and one core element is in the tip-up position.

11. The process of claim 1, wherein the at least two ceramic core elements are connected both in a tip-down position relative to the clamping part.

12. The process of claim 1, wherein the at least two ceramic core elements are formed to have a block, each block having openings that define channels, and the channels defining outlets at a trailing edge of each turbomachine blade of the at least two turbomachine blades.

13. The process of claim 1, further comprising, after the step (b), applying at least one coating layer on an outer surface of the wax.

14. The process of claim 1, wherein the wax forming device is a wax mold device or a 3D wax printing device.

15. The process of claim 1, wherein the ceramic core piece is manufactured by an additive manufacturing process.

* * * * *